United States Patent
Oono et al.

(10) Patent No.: US 7,011,339 B2
(45) Date of Patent: Mar. 14, 2006

(54) PEDAL BRACKET STRUCTURE

(75) Inventors: Takamune Oono, Tokyo (JP); Osamu Saito, Tokyo (JP); Masashi Ishida, Tokyo (JP); Hitoshi Harashima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/005,164

(22) Filed: Dec. 7, 2001

(65) Prior Publication Data

US 2002/0043125 A1  Apr. 18, 2002

(30) Foreign Application Priority Data

Dec. 8, 2000  (JP)  ............. P. 2000-373799

(51) Int. Cl.
  *B60K 28/10*  (2006.01)
  *B60T 7/12*  (2006.01)
(52) U.S. Cl. ............... 280/748; 74/512
(58) Field of Classification Search ............ 74/512, 74/560; 248/548, 900; 188/371, 376; 280/748; 296/35.2
See application file for complete search history.

(56) References Cited

U.S. PATENT DOCUMENTS

| 5,615,749 | A | * | 4/1997 | Kato ............... 180/274 |
| 6,006,626 | A | * | 12/1999 | Notake et al. ......... 74/512 |
| 6,112,615 | A |   | 9/2000 | Nawata et al. ......... 74/512 |
| 6,327,930 | B1 | * | 12/2001 | Ono et al. ........... 74/512 |
| 6,339,971 | B1 | * | 1/2002 | Kato ............... 74/512 |
| 6,481,311 | B1 | * | 11/2002 | Sanagi et al. ......... 74/512 |

FOREIGN PATENT DOCUMENTS

| DE | 10028117 A1 | * | 12/2000 |
| EP | 659615 A1 | * | 6/1995 |
| EP | 0 928 726 A2 |   | 7/1997 |
| EP | 0 928 727 A2 |   | 7/1999 |
| JP | 09254821 A | * | 9/1997 |
| JP | 10-297400 |   | 11/1998 |
| JP | 10338108 A | * | 12/1998 |
| JP | 11-20493 |   | 1/1999 |
| JP | 11-43073 |   | 2/1999 |
| JP | 2000095115 A | * | 4/2000 |
| JP | 2000-163147 |   | 6/2000 |

* cited by examiner

*Primary Examiner*—Chong H. Kim
(74) *Attorney, Agent, or Firm*—McGinn IP Law Group, PLLC

(57) ABSTRACT

A pedal bracket structure wherein a pedal lever is rotatably supported in the vicinity of the rear end portion of a pedal bracket fixed to a toe board at the front end portion thereof, a rigidity supplementing portion is formed in the vicinity of the aforesaid front end portion and a brittle portion is formed at the rear end portion of the rigidity supplementing portion. Only with a simple structural modification in which the rigidity supplementing portion is provided contiguously with the brittle portion formed to promote the absorption of impact by deformation between a mounting portion to the toe board and the brittle portion. While the pedal bracket is made to deform longitudinally easily through the formation of the brittle portion, the pedal bracket provides such a superior rigid feeling that the driver feels no uncertainty in operating the pedal.

21 Claims, 4 Drawing Sheets

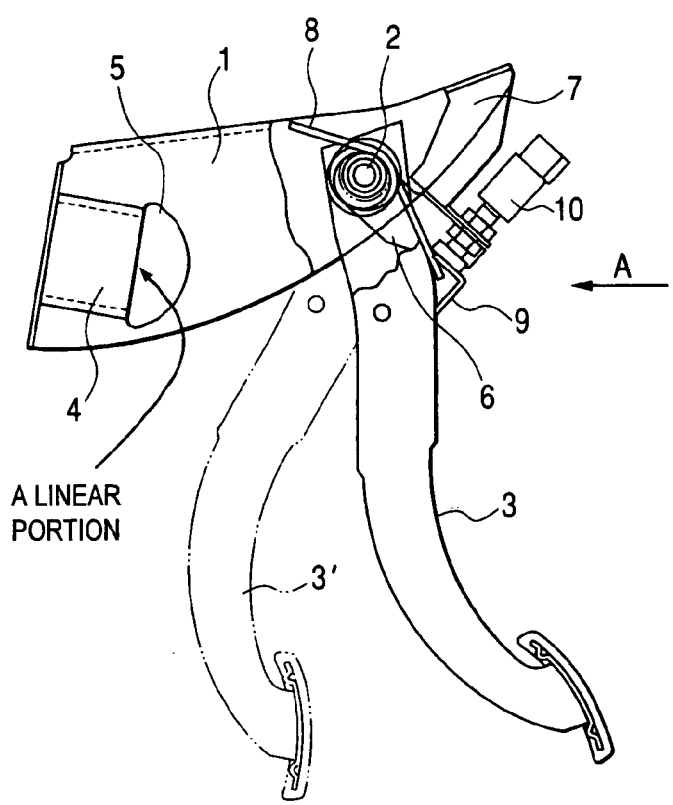
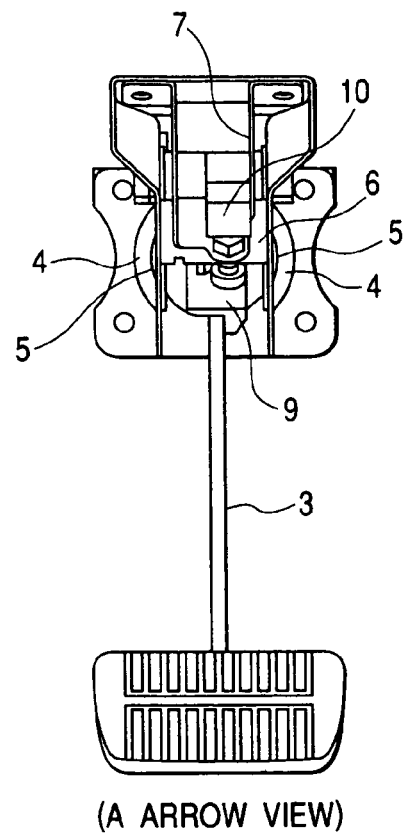
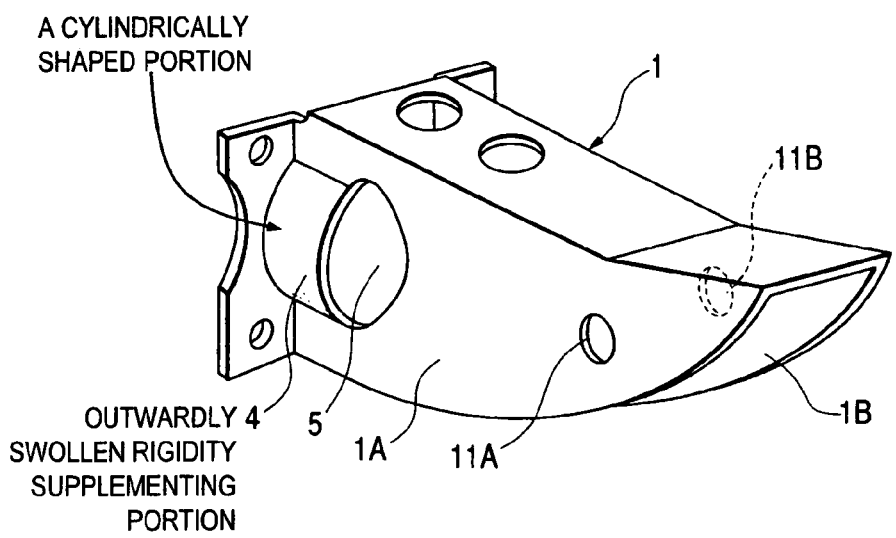

PEDAL BRACKET STRUCTURE

BACKGROUND OF THE PRESENT INVENTION

The present invention relates to a pedal bracket structure for a vehicle brake pedal lever or clutch pedal lever rotatably mounted on the vehicle.

As a pedal bracket structure, various structures have been proposed and in use for a brake pedal lever or clutch pedal lever mounted and rotatably supported on a vehicle such as an automobile. In recent years, pedal bracket structures have been in demand from the viewpoint of crash safety. The pedal bracket structures can effectively prevent the deformation of the pedal toward the driver when impact is applied from front of the vehicle, in particular, in an accident involving a frontal collision. In FIG. 6, a first conventional example of a pedal bracket structure disclosed in Japanese Patent Unexamined Patent Publication No. Hei. 10-297400 is shown, which was proposed as a pedal bracket structure. When an external force that is equal to or greater than a predetermined value is applied from front of the vehicle, the pedal bracket structure can control the displacement of the pedal surface. In this pedal bracket structure, when an external force that is equal to or greater than the predetermined value is applied to the front of the vehicle from front thereof, a certain longitudinal buckling load is inputted into a bracket 110. Side plates 111, 111 of the bracket 110 extend between a bridge member 116 and a mounting member 118. A hole is formed in each of the side plates 111, 111. Consequently, since the longitudinal rigidity of the bracket is decreased by the holes, the bracket is made to crush easily. However, a back plate 140 is provided just above the hole on the side plate 111 to be spaced away from the bridge member 116, whereby the longitudinal rigidity of the bracket is increased. In addition, a flange 142a is disposed on a guide groove bottom surface of the back plate 140. Then, since the flange 142a presses against a pressed portion 131 of a pedal lever 130, the pedal lever 125 swings clockwise, i.e., forward, whereby damage to the driver can be prevented.

In FIG. 7, a second conventional example of a pedal bracket structure disclosed in Japanese Patent Unexamined Publication No. Hei. 9-254821 was proposed as a pedal bracket structure. The pedal bracket structure can ensure that the pedal is withdrawn forward, when energy is inputted to the front of a vehicle. In this pedal bracket structure, a bracket side sliding portion 238 having an inclination angle θ in regard to horizon at an upper end portion of a pedal bracket 222, and a slit 238a is formed in the bracket side sliding portion 238. A vehicle side sliding member 241 is fixed to an instrument panel reinforcement 243. An inclined surface 242 having an inclination angle θ and is formed to be brought into abutment with the bracket side sliding portion 238. A front-end portion of an inclined surface 242 and the slit 238a are fixed with a bolt 240. A direction in which the pedal bracket 222 is released from the bolt 240 is made to substantially coincide with the inclination angle θ of the bracket side sliding portion 238 and the inclined surface 242. Since the bracket side sliding portion 238 released from the bolt 240 is withdrawn along the inclination at the angle θ of the inclined surface 242, a bottom of a pedal lever 218 swings forward of the vehicle accordingly and the withdrawal thereof is restrained.

In the first conventional example of these conventional pedal bracket structures, however, the bracket is constructed so that the longitudinal rigidity is lowered by opening the holes to thereby be easily crushed. Therefore, the back plate 140 is provided on each of the side plate 111 just above the hole to improve the longitudinal rigidity. There may be caused a risk that the deformation promoting function so provided is deteriorated. In addition thereto, since the rigid feeling during the normal pedal operation is reduced, there may be caused a risk that the operability is deteriorated. In the second conventional example, there are involved a number of constituent components, and moreover the large modification is made to the mounting portion to the vehicle body at the rear of the bracket, this making for an increase in production costs.

SUMMARY OF THE PRESENT INVENTION

The present invention was made to cope with this. An object thereof is to provide a pedal bracket supporting structure that can solve the problems inherent in the conventional pedal bracket (supporting) structures. In addition an object thereof is to provide high rigidity and a superior operation feeling while providing a superior capability of absorbing impact through deformation. Further, an object thereof is simple in construction.

With a view to attain the object, according to a first aspect of the present invention, there is provided a pedal bracket structure wherein a pedal lever is rotatably supported in the vicinity of a rear end portion of a pedal bracket fixed to a toe board at a front end portion thereof via a pedal lever pivot, the pedal bracket structure includes a rigidity supplementing portion is formed in the vicinity of the front end portion of the pedal bracket, whereas a brittle portion is formed at a rear end side of the rigidity supplementing portion. According to a second aspect of the present invention, the brittle portion is formed ahead of a pedal lever pivot in a longitudinal direction of the pedal bracket. According to a third aspect of the present invention, the pedal bracket has a rigidity increasing member between the pedal lever pivot and a mounting portion relative to a vehicle body and is located at the rear of the pedal bracket is increased. According to a fourth aspect of the present invention, the rigidity increasing member includes a saddle type switch bracket fastened to said pedal bracket together with the pedal lever pivot in order to increase the rigidity. In addition, a rigidity supplementing bracket disposed between the switch bracket and the mounting portion to the vehicle body is aligned with and fixed to the switch bracket. Thus, according to the structure of the present invention, only with the simple modification, the rigidity of the pedal bracket at operating is ensured. In addition, the pedal bracket is made to easily deform in the longitudinal direction by way of the formation of the brittle portion. By providing the rigidity supplementing portion contiguously with the brittle portion in the vicinity of the front end portion of the pedal bracket, the brittle portion is formed for promotion of impact absorption by way of deformation between the mounting portion to the toe board and the brittle portion.

BRIEF DESCRIPTION OF THE DRAWINGS

FIG. 1A is a side view showing a pedal bracket structure in which a partially cut-away pedal lever is supported, and showing an embodiment of a pedal bracket according to the present invention;

FIG. 1B is a view of the pedal bracket structure as viewed in a direction indicated by an arrow A of FIG. 1, and showing an embodiment of a pedal bracket according to the present invention;

FIG. 2 is a perspective view of the pedal bracket according to the embodiment of the present invention;

DETAILED DESCRIPTION OF THE PREFERRED ENBODIMENTS

Figure 3A:
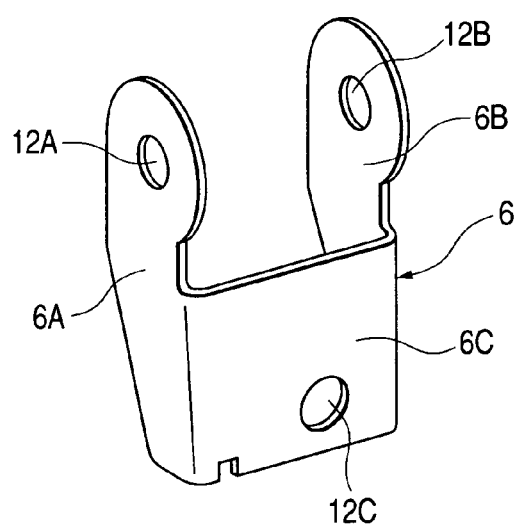
FIG. 3A is a perspective view of a switch bracket according to the embodiment of the present invention.
Figure 3B:
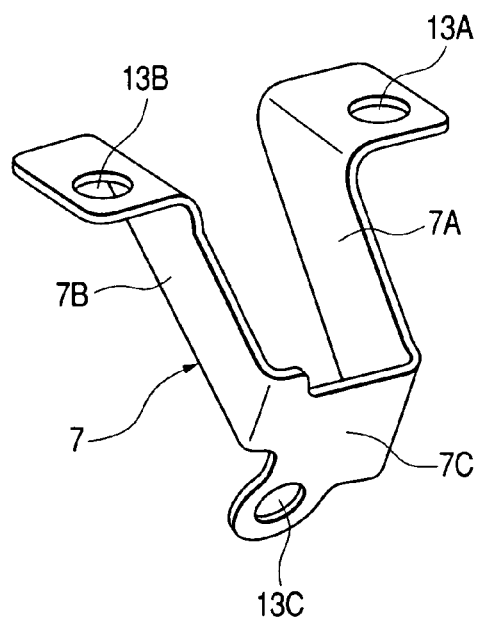
FIG. 3B is a bottom perspective view of a rigid supplementing bracket according to the embodiment.
Figure 4:
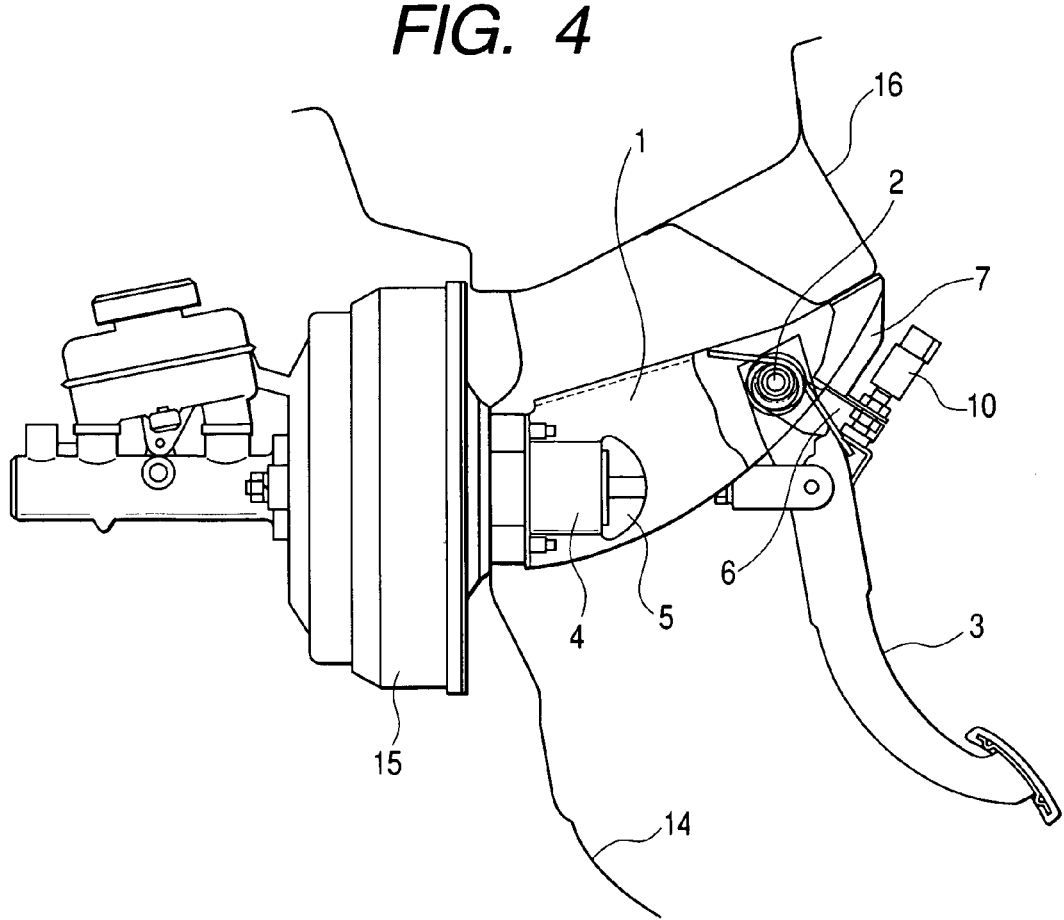
FIG. 4 is a side view of the vicinity of a toe board showing a state in which the pedal bracket is supported according to the embodiment of the present invention.
Figure 5:
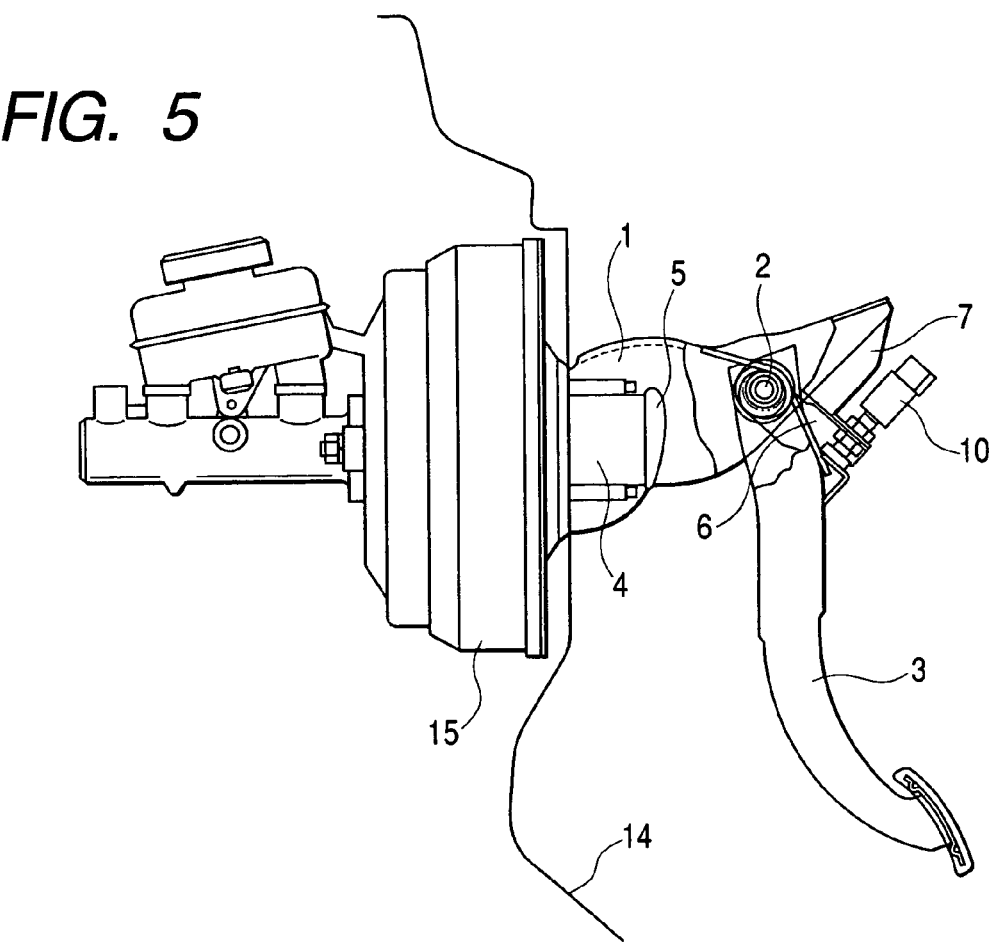
FIG. 5 is a side view of the vicinity of a toe board showing a state in which the pedal bracket is deformed by load applied from front according to the embodiment.
Figure 6:
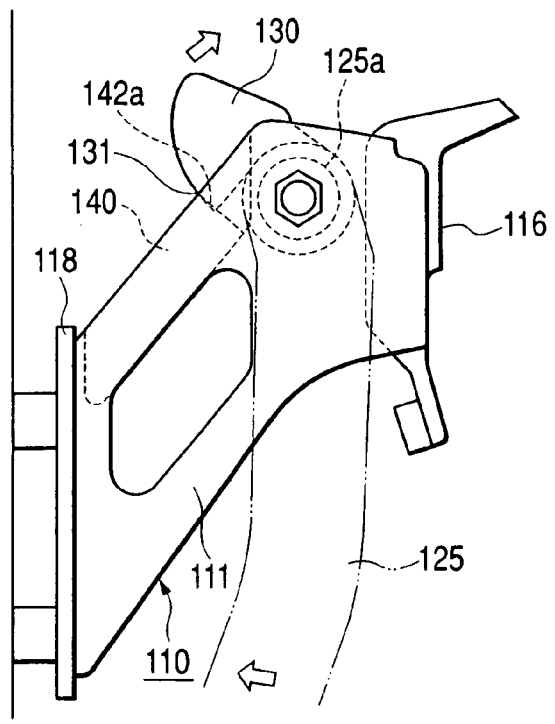
FIG. 6 is a side view of a main part first conventional example showing a first conventional example of a pedal supporting structure.
Figure 7:
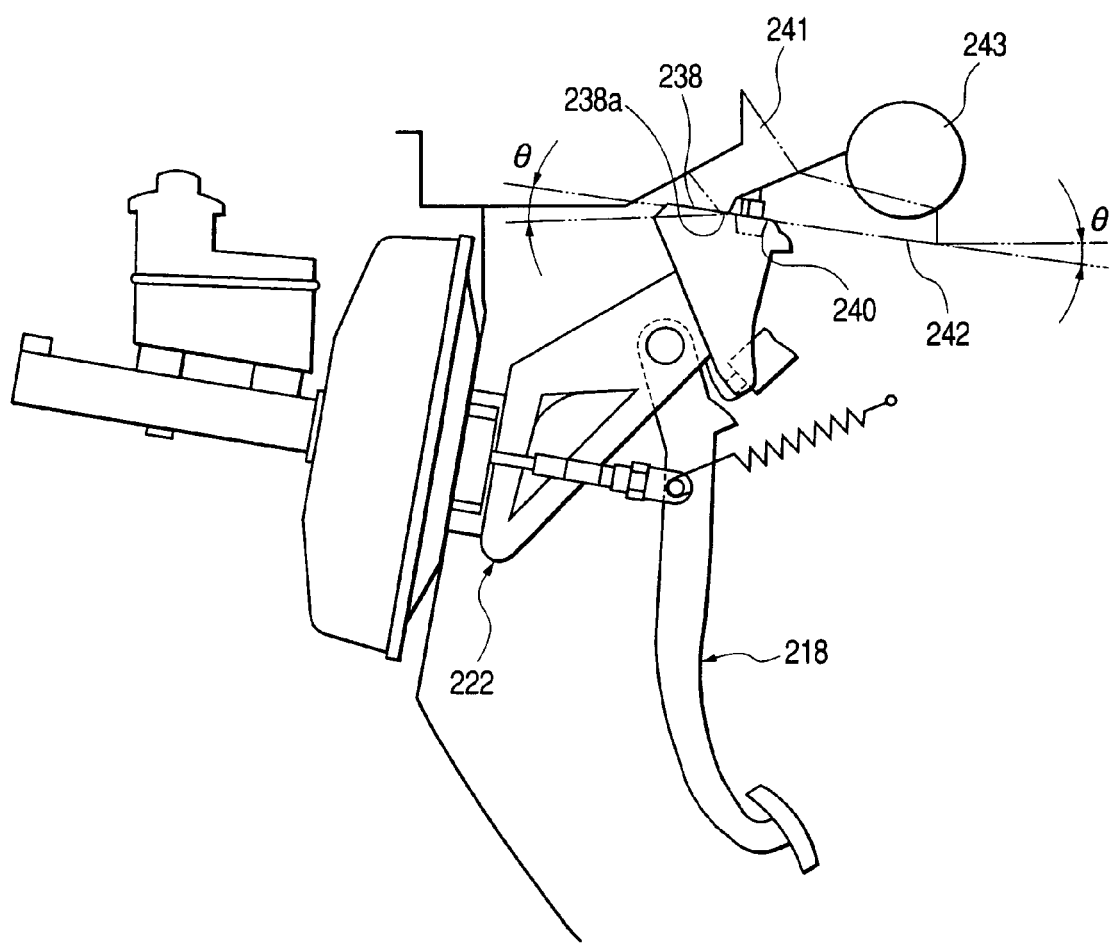
FIG. 7 is a side view of a main part first conventional example showing a second conventional example of a pedal supporting structure.

An embodiment of a pedal bracket structure according to the present invention will be described below with reference to the appended drawings. FIGS. 1 to 5 show an embodiment of a pedal bracket according to the present invention. FIG. 1A is a side view of a partially cut-away pedal bracket structure wherein a pedal lever is supported. FIG. 1B is a view of the pedal bracket structure as seen in a direction indicated by an arrow A of FIG. 1A. FIG. 2 is a perspective view of the pedal bracket. FIG. 3A is a perspective view of a switch bracket. FIG. 3B is a bottom perspective view of a rigidity supplementing bracket. FIG. 4 is a side view in the vicinity of a toe board showing a state in which the pedal bracket is supported. FIG. 5 is a side view in the vicinity of the toe board showing a state in which the pedal bracket is deformed by load applied thereto from front of the vehicle. As shown in FIGS. 1A and 1B, in a pedal bracket structure according to the present invention, a pedal lever 3 is rotatably supported in the vicinity of a rear end portion of a pedal bracket 1. The pedal bracket 1 is fixed to a toe board (refer to reference numeral 14 in FIG. 4) at a front end portion thereof. A rigidity supplementing portion 4 is formed in the vicinity of the front end portion of the toe board. A brittle portion 5 is formed at a rear end portion of the rigidity supplementing portion 4.

As is understood from the perspective view of FIG. 2, the pedal bracket 1 provides a portal configuration, as viewed from the top, which is made to open at a rear end portion thereof. A pedal lever pivot 2 for rotatably supporting the pedal lever 3 is rotatably supported in left and right pivot holes 11A, 11B opened in the vicinity of rear end portions of left and right walls 1A, 1B of the pedal bracket 1. As shown in FIG. 4, the pedal bracket 1 is mounted to the body of a vehicle at the rear end portion thereof with a suspension bracket 16. In addition, with a view to increasing the rigidity between the pedal lever pivot 2 and the mounting portion to the vehicle body (the aforesaid suspension bracket 16) at the rear of the pedal bracket 1, a saddle type switch bracket 6 as shown in FIG. 3A is fastened together with the pedal lever pivot 2. The pedal lever pivot 2 is inserted into pivot supporting holes 12A, 12B in left and right arms 6A, 6B of the switch bracket 6. Note that a member denoted by reference numeral 8 in FIG. 1A is a coil spring wound around the pedal lever pivot 2 for returning the pedal lever 3 to its initial position. In addition, reference numeral 3' denotes a pedal position taken by the pedal when it is depressed.

Furthermore, a rigidity supplementing bracket 7 (preferably this is also a saddle type bracket as with the switch bracket 6) is disposed between the switch bracket 6 and the mounting portion to the vehicle body. The switch bracket 6 and a rigidity supplementing bracket 7 are aligned with and fixed to each other at switch mounting surfaces 6C, 7C thereof. The rigidity supplementing bracket 7 is mounted to a lower end portion of the suspension bracket 16 with mounting bolts which are inserted into mounting holes 13A, 13B formed in upper end portions of left and right arms 7A, 7B of the rigidity supplementing bracket 7. Then, a switch member 10 is passed through switch mounting holes 12C, 13C in the switch mounting surfaces 6C, 7C of the switch bracket 6 and the rigidity supplementing bracket 7 to be mounted and fixed to both of the brackets. Thus, the switch member 10 itself functions as a fixing tool for fixing both of the switch mounting surfaces 6C, 7C which are aligned with each other as well. A distal end portion of the switch member 10 is disposed within the operation range of a pressing piece 9 mounted on the pedal lever 3.

As shown in FIG. 2, the rigidity supplementing portion 4 according to this embodiment adopts a swelling bead (e.g., a cylindrically-shaped portion). The swelling bead is formed to swell outwardly from a portion in the vicinity of the front end portion of each of the left and right side walls 1A, 1B of the pedal bracket 1 through pressing. Semi-circular hole portions (brittle portions) 5, 5 are formed contiguously with rear ends of the swelling beads (rigidity supplementing portions) 4, 4 as the brittle portion. The hole portion 5 as the brittle portion is formed ahead of the pedal lever pivot 2 as viewed longitudinally. According to the above structure, the swelling beads 4 as the rigidity supplementing portion are provided contiguously with the hole portions 5 as the brittle portion formed to promote the absorption of impact through deformation between the mounting portion to the toe board and the hole portion 5. According to the above construction, while the pedal bracket is made to deform longitudinally easily by the formation of the brittle portion, only with the simple structural modification of the swelling beads 4, the pedal bracket provides such a superior rigid feeling. In addition, the driver feels no uncertainty in operating the pedal, when the pedal is operated during the normal pedal operation, because the rigidity is supplemented in an ensured fashion against a force applied in the closing direction of the pedal.

In FIGS. 4 and 5, in the case that an impact load is applied from front of the vehicle to the toe board 14 where the pedal bracket structure of the present invention is mounted, the toe board 14 together with a brake booster 15 and the likes deform rearward of the vehicle or toward the driver. However, since the hole portions 5 are the brittle portion and whose rigidity is ensured by the swelling beads 4 as the rigidity supplementing portion at the time of normal pedal operation, the hole portions 5 deform to absorb the impact load sufficiently ahead of the pedal lever 3. Moreover, the rear end portion of the pedal bracket 1 configured to open thereat is prevented from being expanded by the saddle type switch bracket 6 fastened together with the pedal lever pivot 2, when the bracket is deformed by the load from front. In addition, with an extension function provided by the rigid supplementing bracket 7 aligned with and fixed to the switch bracket 6, the higher rigidity of the bracket is maintained. Therefore, the uncontrolled deformation in the vicinity of the pedal pivot supporting portion is prevented, whereby the withdrawal of the pedal lever against the driver side is effectively restrained and the smooth impact absorption is attained by the stable deformation at the hole portions 5.

Thus, in the above embodiment of the present invention, without departing from the spirit and scope of the present invention, appropriate modifications can be selected to be made to the configuration of the pedal bracket and mode for mounting the bracket to the vehicle body such as the toe board (the front surface itself of the pedal bracket may be mounted on the toe board or the pedal bracket may be so mounted via a mounting member prepared separately) including the configuration of the rigid supplementing portion and the brittle portion. Appropriate modifications can be also selected to mode for forming the same (the swelling bead as the brittle portion may be provided as a curved rib or a rigid supplementing plate may be attached thereto, the brittle portion may be constituted by a number of slits or formed into a thin portion), including the configuration of the pedal lever and mode for rotatably supporting the pedal lever on the pedal bracket, the configuration of the switch bracket and the rigid supplementing bracket and mode for aligning and fixing them together, and the mode for mounting the switch bracket and rigid supplementing bracket to the pedal bracket and the suspension bracket.

As has been described heretofore, according to the present invention, in the pedal bracket structure wherein the pedal lever is rotatably supported in the vicinity of the rear end portion of the pedal bracket which is fixed to the toe board at the front end portion thereof, the rigidity supplementing portion is formed in the vicinity of the aforesaid front end portion and the brittle portion is formed at the rear end portion of the rigidity supplementing portion. Therefore, only with the simple structural modification in which the swelling beads as the rigidity supplementing portion are provided contiguously with the hole portions as the brittle portion formed to promote the absorption of impact through deformation between the mounting portion to the toe board and the hole portions, while the pedal bracket is made to deform longitudinally easily through the formation of the brittle portion, the pedal bracket provides such a superior rigid feeling that the driver feels no uncertainty in operating the pedal since the rigidity is supplemented in an ensured fashion against a force applied in the closing direction when the pedal is operated during the normal pedal operation.

In addition, by forming the brittle portion ahead of the pedal lever pivot as viewed in the longitudinal direction of the vehicle body, the brittle portion effectively deforms to absorb impact ahead of the pedal lever pivot supporting portion. Therefore, the deformation in the vicinity of the pedal lever pivot supporting portion is suppressed to thereby eliminate the risk that the diver is injured.

Furthermore, by increasing the rigidity between the pedal lever pivot and the mounting portion to the vehicle body at the rear of the pedal bracket, the uncontrolled deformation in the vicinity of the pedal pivot supporting portion is suppressed by the high rigidity rearward of the pedal pivot supporting portion. With only the brittle portion is allowed to deform effectively, the withdrawal of the pedal lever toward the driver side is effectively restrained.

Furthermore, in a case where the saddle type switch bracket is fastened together with the pedal lever pivot in order to attain the high rigidity. The rigidity supplementing bracket, which is disposed between the switch bracket and the mounting portion to the vehicle body, is aligned with and fixed to the switch bracket in order to attain the high rigidity. In this case, even if the rear end portion of the pedal bracket is configured to open, the rigid feeling is ensured by the switch bracket fastened together with the pedal lever pivot at the time of normal pedal operation. In addition, the expansion of the open end is prevented when the bracket is deformed by the load from front of the vehicle. Thus, with these functions together with an extension function provided by the rigid supplementing bracket aligned with and fixed to the switch bracket, the higher rigidity of the bracket is maintained. Therefore, the uncontrolled deformation in the vicinity of the pedal pivot supporting portion is prevented, whereby the withdrawal of the pedal lever toward the driver side is effectively restrained and the smooth impact absorption is attained through the stable deformation at the brittle portion.

Thus, according to the present invention, provided without accompanying large modifications is the pedal bracket structure which is high in rigidity, superior in operation feeling and simple in construction while it has the superior capability of absorbing impact through deformation.

What is claimed is:

1. A pedal bracket structure comprising:
   a pedal bracket fixed at a front end portion to a toe board;
   a pedal lever rotatably supported by a rear end portion of said pedal bracket via a pedal lever pivot; and
   a rigidity increasing member comprising a saddle shaped switch bracket fastened to said pedal bracket such that said pedal lever pivot extends through said saddle type switch bracket,
   wherein said pedal bracket comprises:
      an outwardly swollen rigidity supplementing portion in said front end portion of said pedal bracket, and
      a brittle portion contiguous to and at a rear side of said rigidity supplementing portion.

2. The pedal bracket structure as set forth in claim 1, wherein said brittle portion is ahead of said pedal lever pivot in a longitudinal direction of said pedal bracket.

3. The pedal bracket structure as set forth in claim 1, wherein said rigidity increasing member is between said pedal lever pivot and a vehicle body and is located at the rear of said pedal bracket.

4. The pedal bracket structure as set forth in claim 3, wherein said rigidity increasing member further comprises:
   a rigidity supplementing bracket between said switch bracket and said vehicle body,
   wherein said rigidity supplementing bracket is aligned with and fixed to said switch bracket.

5. The pedal bracket structure as set forth in claim 2, wherein said rigidity increasing member is between said pedal lever pivot and a vehicle body, and is located at the rear of said pedal bracket.

6. The pedal bracket structure as set forth in claim 1, wherein said brittle portion comprises a semi-circular shape.

7. The pedal bracket structure as set forth in claim 6, wherein said brittle portion has a semi-circular shaped hole formed therein.

8. A pedal bracket structure comprising:
   a pedal bracket fixed to a toe board;
   a pedal lever rotatably supported by said pedal bracket by a pedal lever pivot; and
   a rigidity increasing member comprising a saddle shaped switch bracket fastened to said pedal bracket such that said pedal lever pivot extends through said saddle shaped switch bracket,
   wherein said pedal bracket comprises:
      an outwardly swollen rigidity supplementing portion formed in a front end portion of said pedal bracket; and a brittle portion contiguous to and formed at a rear side of said outwardly swollen rigidity supplementing portion.

9. The structure of claim 8, wherein said outwardly swollen rigidity supplementing portion comprises a swollen bead.

10. The structure of claim 8, wherein said outwardly swollen rigidity supplementing portion comprises a curved rib.

11. The structure of claim 8, wherein said pedal bracket further comprises a rigidity supplementing plate attached to said outwardly swollen rigidity supplementing portion.

12. The structure of claim 8, wherein said brittle portion has a semi-circular hole formed therein.

13. The structure of claim 8, wherein said brittle portion comprises a thin portion.

14. The structure of claim 8, wherein said rigidity increasing member further comprises:
a rigidity supplementing bracket attached to said saddle shaped switch bracket and further mounted to a vehicle body.

15. A pedal structure comprising:
a pedal bracket;
a pedal lever rotatably supported by said pedal bracket by a pedal lever pivot; and
a rigidity increasing member comprising a saddle shaped switch bracket fastened to said pedal bracket such that said pedal lever pivot extends through said saddle shaped type switch bracket, wherein said pedal bracket comprises:
an outwardly swollen rigidity supplementing portion formed in a front end portion of said pedal bracket; and
a brittle portion contiguous to and at a rear side of said outwardly swollen rigidity supplementing portion.

16. The pedal structure of claim 15, wherein said outwardly swollen rigidity supplementing portion comprises a cylindrically-shaped portion.

17. The pedal structure of claim 16, wherein said rear side of said cylindrically-shaped portion is defined by said brittle portion.

18. The pedal bracket structure of claim 1, wherein said outwardly swollen rigidity supplementing portion comprises a cylindrically-shaped portion.

19. The pedal bracket structure of claim 18, wherein said rigidity increasing member is fastened at said pedal lever pivot.

20. The pedal bracket structure of claim 19, wherein said rigidity increasing member forms pivot supporting holes, said pedal lever pivot being inserted into said pivot supporting holes.

21. The pedal bracket structure of claim 4, wherein said rigidity supplementing bracket comprises arms having mounting holes for mounting said rigidity supplementing bracket to a suspension bracket.

* * * * *